United States Patent
Kaneko et al.

(10) Patent No.: US 10,527,905 B2
(45) Date of Patent: Jan. 7, 2020

(54) ELECTROCHROMIC ELEMENT, DISPLAY DEVICE AND DRIVING METHOD THEREOF

(71) Applicants: Fuminari Kaneko, Kanagawa (JP); Koh Fujimura, Tokyo (JP); Hidekazu Yaginuma, Kanagawa (JP); Keiichiroh Yutani, Kanagawa (JP); Takahiko Matsumoto, Kanagawa (JP); Mamiko Inoue, Tokyo (JP); Tohru Yashiro, Kanagawa (JP)

(72) Inventors: Fuminari Kaneko, Kanagawa (JP); Koh Fujimura, Tokyo (JP); Hidekazu Yaginuma, Kanagawa (JP); Keiichiroh Yutani, Kanagawa (JP); Takahiko Matsumoto, Kanagawa (JP); Mamiko Inoue, Tokyo (JP); Tohru Yashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 87 days.

(21) Appl. No.: 15/566,018

(22) PCT Filed: May 12, 2016

(86) PCT No.: PCT/JP2016/002339
§ 371 (c)(1),
(2) Date: Oct. 12, 2017

(87) PCT Pub. No.: WO2016/203700
PCT Pub. Date: Dec. 22, 2016

(65) Prior Publication Data
US 2018/0113366 A1    Apr. 26, 2018

(30) Foreign Application Priority Data

Jun. 19, 2015  (JP) ................................ 2015-123459
Feb. 17, 2016  (JP) ................................ 2016-028259

(51) Int. Cl.
*G02F 1/155*   (2006.01)
*G02F 1/1343*  (2006.01)
(Continued)

(52) U.S. Cl.
CPC .......... *G02F 1/155* (2013.01); *G02F 1/13439* (2013.01); *G02F 1/1503* (2019.01); *G02F 1/163* (2013.01); *G02F 2202/22* (2013.01)

(58) Field of Classification Search
None
See application file for complete search history.

(56) References Cited

U.S. PATENT DOCUMENTS 5,073,011 A * 12/1991 Ito ........................... G02F 1/163
359/265
8,452,221 B2   5/2013 Kaneko et al.
(Continued)

FOREIGN PATENT DOCUMENTS

JP   S59-159134   9/1984
JP   H01-259325   10/1989
(Continued)

OTHER PUBLICATIONS

International Search Report dated Jul. 26, 2016 in PCT/JP2016/002339 filed on May 12, 2016.
Korean Office Action for 10-2017-7034419 dated Feb. 18, 2019.

*Primary Examiner* — William R Alexander
*Assistant Examiner* — Gary W O'Neill
(74) *Attorney, Agent, or Firm* — IPUSA, PLLC (57) ABSTRACT

An electrochromic element includes first and second display electrodes arranged at intervals and opposed to each other, at least one of the first and second display electrodes being transparent; an electrolyte provided between the first and second display electrodes; a first electrochromic layer including at least one of an oxidized electrochromic com-
(Continued)

pound and an oxidized electrochromic composition, and contacting the first display electrode and the electrolyte; a second electrochromic layer including at least one of a reduced electrochromic compound and a reduced electrochromic composition, and contacting the second display electrode and the electrolyte; third and fourth auxiliary electrodes contacting the electrolyte; a reduction layer provided on the third auxiliary electrode and including a reductant of a first material; and an oxidation layer provided on the fourth auxiliary electrode and including an oxidant of a second material. The first and second materials can be oxidized and reduced reversibly.

11 Claims, 3 Drawing Sheets

(51) Int. Cl.
*G02F 1/1503* (2019.01)
*G02F 1/163* (2006.01)

(56) References Cited

U.S. PATENT DOCUMENTS

| | | |
|---|---|---|
| 8,463,171 B2 | 6/2013 | Katano et al. |
| 8,663,893 B2 | 3/2014 | Katano et al. |
| 8,693,939 B2 | 4/2014 | Tomono et al. |
| 8,699,933 B2 | 4/2014 | Katano et al. |
| 8,900,784 B2 | 12/2014 | Katano et al. |
| 2009/0190198 A1 | 7/2009 | Kwon |
| 2013/0250394 A1* | 9/2013 | Okada ............... G02F 1/155 359/269 |
| 2014/0362430 A1 | 12/2014 | Yamamoto et al. |
| 2015/0168796 A1 | 6/2015 | Yashiro et al. |

FOREIGN PATENT DOCUMENTS

| | | |
|---|---|---|
| JP | H04-060617 | 2/1992 |
| JP | H04-070717 | 3/1992 |
| JP | 2009-181118 | 8/2009 |
| JP | 2014-112183 | 6/2014 |
| KR | 10-1999-0086433 | 12/1999 |

* cited by examiner

ELECTROCHROMIC ELEMENT, DISPLAY DEVICE AND DRIVING METHOD THEREOF

TECHNICAL FIELD

The disclosure herein generally relates to an electrochromic element, a display device and a driving method thereof.

BACKGROUND ART

Electrochromism is a phenomenon in which an oxidation-reduction reaction occurs reversibly and color varies reversibly by applying an electric voltage. The electrochromism is formed between two opposing electrodes, and in a configuration where an ion conductable electrolyte layer fills in between the electrodes and an oxidation-reduction reaction occurs. When a reduction reaction occurs adjacent to one of the two opposing electrodes, an oxidation reaction that is the inverse reaction occurs adjacent to the other electrode.

When a transparent display device is obtained with the electrochromic element by using the electrochromism, or by having a structure, in which three color development layers of cyan (C), magenta (M) and yellow (Y) are laminated, it is important for the element to be made of a reduced electrochromic material, a neutral state of which is a transparent state, or an oxidized electrochromic material, a neutral state of which is transparent.

Moreover, for such a brightly colored display device, an organic electrochromic material, which has various colors depending on substituent groups, is suitable. In particular, in order to enable a high contrast ratio in a transparent state (achromatic state) and a chromatic state, one of the pair of electrodes preferably has a layer including the oxidized electrochromic material and the other of the pair of electrodes preferably has a layer including the reduced electrochromic material.

However, in such a bipolar coloring electrochromic element, by repeating the cycle of coloring and decoloring, imbalance may occur between electric charges held on both poles, and electric charges remain on one of the electrodes in the achromatic state, and thereby a phenomenon of erasing residue, in which color does not completely disappear, occurs. The erasing residue is guessed to be a phenomenon occurring by a plurality of factors, such as a small amount of impurities in the device, temperature, electric voltage, or irreversible oxidation and reduction, having complex influence on each other. Furthermore, on which electrode the erasing residue occurs or how much the erasing residue is depends on usage conditions of the device. Therefore, it is difficult to completely prevent the erasing residue from occurring, or to predict it at a design phase. It is a problem.

In order to solve the problem, for example, Patent Document 1 discloses an electrochromic element in which an auxiliary electrode for charge compensation is provided and an electric voltage is applied between the electrode where an erasing residue occurs and the auxiliary electrode, and thereby the erasing residue is removed without putting an extra load on an electrochromic material for display or an electrolyte.

Moreover, Patent Document 2 discloses an electrochromic element in which an auxiliary electrode having an oxidation-reduction material is formed in a part irrelevant to the display, and an electric voltage is applied between the auxiliary electrode and an electrochromic layer, and thereby a colored state or an achromatic state can be maintained for a long period.

CITATION LIST

Patent Literature

[PTL 1] Japanese Unexamined Patent Application Publication No. H4-60617
[PTL 2] Japanese Unexamined Patent Application Publication No. S59-159134

SUMMARY OF INVENTION

Technical Problem

However, in the electrochromic element disclosed in Patent Document 1 or Patent Document 2, all the erasing residues are erasing residues of oxidized electrochromic materials. Neither Patent Document 1 nor Patent Document 2 mentions an erasing residue of a reduced electrochromic material.

Moreover, all the oxidized-reduced materials for the auxiliary electrode are oxidized materials, and the reduced material is not disclosed. Then, if an erasing residue of the reduced electrochromic material remains, when the erasing residue is attempted to be erased by using the auxiliary electrode, the oxidized-reduced material on the auxiliary electrode is not reduced, but the electrolyte is reduced instead on a surface of the auxiliary electrode, which leads to a problem that the electrolyte may be altered, bubbles are generated or the like.

In particular, in the electrochromic element disclosed in Patent Document 1 or Patent Document 2, a main factor for an erasing residue is considered to be oxidation by Oxygen, and an erasing residue of the reduced electrochromic material is not assumed at all. The erasing residue of the reduced electrochromic material is a new problem in a display device which has high contrast and bright color reproducibility.

It is an object of at least one embodiment of the present invention to provide an electrochromic element, a display device and a driving method thereof that substantially obviate one or more problems caused by the limitations and disadvantages of the related art.

Solution to Problem

According to an aspect of the invention, an electrochromic element includes first and second display electrodes arranged at intervals and opposed to each other, at least one of the first and second display electrodes being transparent; an electrolyte provided between the first and second display electrodes; a first electrochromic layer including at least one of an oxidized electrochromic compound and an oxidized electrochromic composition, and contacting the first display electrode and the electrolyte; a second electrochromic layer including at least one of a reduced electrochromic compound and a reduced electrochromic composition, and contacting the second display electrode and the electrolyte; third and fourth auxiliary electrodes contacting the electrolyte; a reduction layer provided on the third auxiliary electrode, and including a reductant of a first material; and an oxidation layer provided on the fourth auxiliary electrode, and including an oxidant of a second material. The first and second materials can be oxidized and reduced reversibly.

According to another aspect of invention, a display device includes an electrochromic element and a chassis. The electrochromic element includes first and second display electrodes arranged at intervals and opposed to each other, at least one of the first and second display electrodes being transparent; an electrolyte provided between the first and second display electrodes; a first electrochromic layer including at least one of an oxidized electrochromic compound and an oxidized electrochromic composition, and contacting the first display electrode and the electrolyte; a second electrochromic layer including at least one of a reduced electrochromic compound and a reduced electrochromic composition, and contacting the second display electrode and the electrolyte; third and fourth auxiliary electrodes contacting the electrolyte; a reduction layer provided on the third auxiliary electrode, and including a reductant of a first material; and an oxidation layer provided on the fourth auxiliary electrode, and including an oxidant of a second material. The first and second materials can be oxidized and reduced reversibly. The chassis covers the electrochromic element so that the first display electrode and the second display electrode are visible from outside and the third auxiliary electrode and the fourth auxiliary electrode are invisible from outside.

According to yet another aspect of invention, a driving method is performed for driving an electrochromic element to control a color of a first electrochromic layer or a second electrochromic layer. The electrochromic element includes first and second display electrodes arranged at intervals and opposed to each other, at least one of the first and second display electrodes being transparent; an electrolyte provided between the first and second display electrodes; a first electrochromic layer including at least one of an oxidized electrochromic compound and an oxidized electrochromic composition, and contacting the first display electrode and the electrolyte; a second electrochromic layer including at least one of a reduced electrochromic compound and a reduced electrochromic composition, and contacting the second display electrode and the electrolyte; third and fourth auxiliary electrodes contacting the electrolyte; a reduction layer provided on the third auxiliary electrode, and including a reductant of a first material; and an oxidation layer provided on the fourth auxiliary electrode, and including an oxidant of a second material. The first and second materials can be oxidized and reduced reversibly. The method includes applying an electric voltage between the third auxiliary electrode and the fourth auxiliary electrode to generate electric charges; and applying an electric voltage between the first display electrode and the fourth auxiliary electrode or between the second display electrode and the third auxiliary electrode to discharge electric charges.

According to yet another aspect of invention, a driving method is performed for driving an electrochromic element to control a color of a first electrochromic layer of a second electrochromic layer. The electrochromic element includes first and second display electrodes arranged at intervals and opposed to each other, at least one of the first and second display electrodes being transparent; an electrolyte provided between the first and second display electrodes; a first electrochromic layer including at least one of an oxidized electrochromic compound and an oxidized electrochromic composition, and contacting the first display electrode and the electrolyte; a second electrochromic layer including at least one of a reduced electrochromic compound and a reduced electrochromic composition, and contacting the second display electrode and the electrolyte; third and fourth auxiliary electrodes contacting the electrolyte; a reduction layer provided on the third auxiliary electrode, and including a reductant of a first material; and an oxidation layer provided on the fourth auxiliary electrode, and including an oxidant of a second material. The first and second materials can be oxidized and reduced reversibly. The method includes applying an electric voltage between the first display electrode and the fourth auxiliary electrode or between the second display electrode and the third auxiliary electrode to discharge electric charges; and applying an electric voltage between the third auxiliary electrode and the fourth auxiliary electrode to discharge electric charges.

Advantageous Effects of Invention

According to embodiments of the present invention, an electrochromic element that can remove both the erasing residues of an oxidized electrochromic material and of a reduced electrochromic material is provided.

DESCRIPTION OF EMBODIMENTS

In the following, embodiments of the present invention will be described with reference to the accompanying drawings. In the drawings, the same reference numeral is assigned to the same components, and duplicate explanation will not be provided.

<<Structure of Electrochromic Element>>

Figure 1:
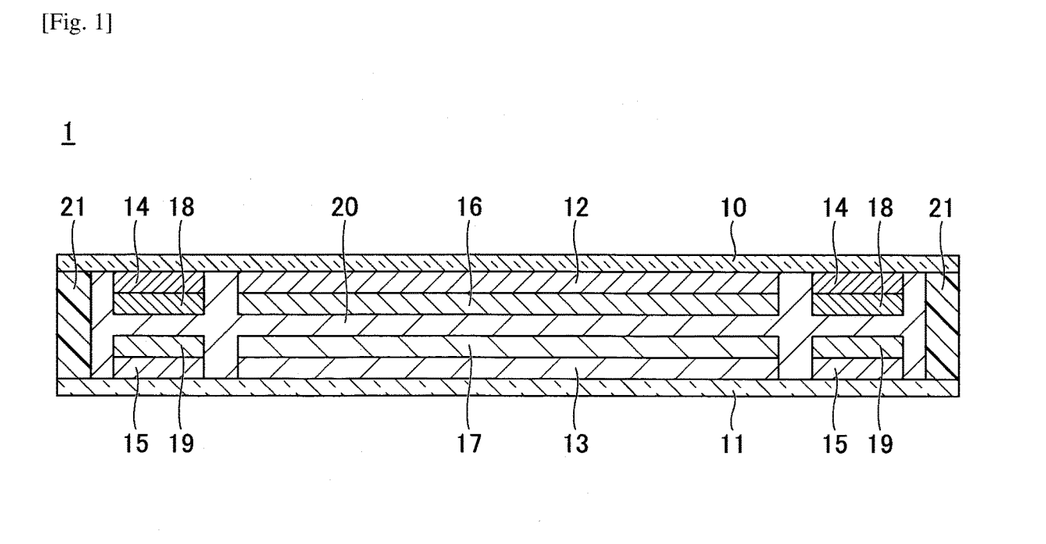
FIG. 1 is a cross-sectional view depicting an example of an electrochromic element according to an embodiment.

FIG. 1 is a cross-sectional view depicting an example of an electrochromic element according to an embodiment. With reference to FIG. 1, the electrochromic element 1 includes a first support 10, a second support 11, a first electrode for display 12, a second electrode for display 13, a third auxiliary electrode 14, a fourth auxiliary electrode 15, a first electrochromic layer 16, a second electrochromic layer 17, a reduction layer 18, an oxidation layer 19, an electrolyte 20 and a sealant 21.

In the embodiment, for the sake of convenience, a side on the first support 10 of the electrochromic element 1 will be referred to as an upper side or a one side, and a side on the second support 11 will be referred to as a lower side or the other side. Moreover, a face on the side of the first support 10 of each component will be referred to as one face or a top face, and a face on the side of the second support 11 will be referred to as the other face or a bottom face. However, the electrochromic element 1 can be used in a state where it is upside down, or can be arranged at an arbitrary angle. In addition, a planar view is assumed to be viewing an object in a direction orthogonal to the one face of the first support 10, and a planar shape is assumed to be a shape of the object viewed from the direction orthogonal to the one face of the first support 10.

In the electrochromic element 1, on the bottom face of the first support 10, the first electrode for display 12 is provided. Moreover, on the top face of the second support 11, the second electrode for display 13 is provided. The first electrode for display 12 and the second electrode for display 13 are arranged at a predetermined interval in the depth direction and being opposed to each other. The electrolyte 20 is arranged between the first electrode for display 12 and the second electrode for display 13. The first electrode for display 12 and the second electrode for display 13 are display electrodes. At least one of the first electrode for display 12 and the second electrode for display is transparent.

On the bottom face of the first electrode for display 12, the first electrochromic layer 16 including one or both of an oxidized electrochromic compound and an oxidized electrochromic composition is arranged. Moreover, on the top face of the second electrode for display 13, the second electrochromic layer 17 including one or both of a reduced electrochromic compound and a reduced electrochromic composition is arranged.

However, the first electrochromic layer 16 may be arranged at any position as long as the first electrochromic layer 16 contacts the first electrode for display 12 and the electrolyte 20. For example, the first electrochromic layer 16 may be arranged on the top face of the first electrode for display 12. Similarly, the second electrochromic layer 17 may be arranged at any position as long as the second electrochromic layer 17 contacts the second electrode for display 13 and the electrolyte 20. For example, the second electrochromic layer 17 may be arranged on the bottom side of the second electrode for display 13.

Moreover, within the same face of the bottom face of the first support 10 as the first electrode for display 12, the third auxiliary electrode 14 is arranged at a predetermined interval from the first electrode for display 12. Moreover, within the same face of the top face of the second support 11 as the second electrode for display 13, the fourth auxiliary electrode 15 is arranged at a predetermined interval. The third auxiliary electrode 14 and the fourth auxiliary electrode 15 can be arranged, for example, so as to surround an outer periphery of a display region including the first electrode for display 12 and the second electrode for display 13. The third auxiliary electrode 14 and the fourth auxiliary electrode 15 are arranged at a predetermined interval in the depth direction and being opposed to each other. The electrolyte 20 is arranged between the third auxiliary electrode 14 and the fourth auxiliary electrode 15. However, the third auxiliary electrode 14 and the fourth auxiliary electrode 15 may be arranged at any positions as long as the third auxiliary electrode 14 and the fourth auxiliary electrode 15 contact the electrolyte 20.

On the bottom face of the third auxiliary electrode 14, the reduction layer 18 is arranged. The reduction layer 18 is a layer including a reductant of a material which can be reversibly oxidized and reduced. Moreover, on the top face of the fourth auxiliary electrode 15, the oxidation layer 19 is arranged. The oxidation layer 19 is a layer including an oxidant of a material which can be oxidized and reduced.

However, the reduction layer 18 only has to be arranged on a surface of the third auxiliary electrode 14. Specifically, the reduction layer 18 may be arranged on the top face of the third auxiliary electrode 14, on the bottom face, or on both the top face and the bottom face. Similarly, the oxidation layer 19 only has to be arranged on a surface of the fourth auxiliary electrode 15. Specifically, the oxidation layer 19 may be arranged on the top face of the fourth auxiliary electrode 15, on the bottom face, or on both the top face and the bottom face.

Each component of the electrochromic element 1 arranged between the first support 10 and the second support 11 is sealed by the sealant 21 provided on an outer periphery of each component.

In the following, each component of the electrochromic element 1 will be described in detail.

(Electrochromic Composition)

The electrochromic composition that can be used for the first electrochromic layer 16 or the second electrochromic layer 17 has a feature that an electrochromic compound is coupled to a semi-conductive or conductive nanostructure. A preferable range of film thickness of a layer of the electrochromic composition is 0.2 to 5.0 μm. When the film thickness is smaller than this range, it is difficult to obtain color optical density. When the film thickness is greater than this range, manufacturing cost increases and visibility is likely to be degraded due to coloring.

(Electrochromic Compound)

The electrochromic compound that can be used for the first electrochromic layer 16 or the second electrochromic layer 17 is a material that changes color by an oxidation reaction or a reduction reaction. For the above material, a publicly known electrochromic compound is used which may be polymer-based, pigment-based, a metallic compound, a metallic oxide or the like.

Specifically, the electrochromic compound of polymer system or pigment system includes a low molecular organic electrochromic compound may be azobenzene-based, anthraquinone-based, diarylethene-based, dihydroprene-based, styryl-based, stylyl spiropyran based, spirooxazine based, spirothiopyran based, thioindigo based, tetrathiafulvalene based, terephthalic acid based, triphenylmethane based, triphenylamine based, naphthopyran based, viologen based, pyrazoline based, phenazine based, phenylenediamine based, phenoxazine based, phenothiazine based, phthalocyanine based, fluoran based, fulgide based, benzopyran based, metallocene based or the like, and a conductive high molecular compound such as polyanillene or polythiophene.

In the above description, a dipyridine based compound expressed by chemical expression (1) is more preferably included. Because these materials have low coloring-decoloring electric potential, even if they are used in an electrochromic element having a plurality of display electrodes, excellent color values of coloring are shown according to a reduction electric potential.

[Chem. 1]

(1)

In the chemical expression (1), R1 and R2 represent alkyl groups or aryl groups with carbon numbers from 1 to 30, each of which may have substituent groups independently. X represents a monovalent anion. Respective integers, n, m and l, represent 0 or 1, independently. Each of A, B and C represents an aryl group or a heterocyclic group with carbon number from 2 to 20, which may have a substituent group independently.

Moreover, for the electrochromic compound of metallic compound or metallic oxide, an inorganic based electrochromic compound, such as titanium oxide, vanadium oxide, tungsten oxide, indium oxide, iridium oxide, nickel oxide, or Prussian blue, can be used.

In the embodiment, a material, which has an initial state of a neutral state and changes color reversibly by oxidizing, will be referred to as an oxidized electrochromic material (an oxidized electrochromic compound or an oxidized electrochromic composition). Moreover, a material, which has an initial state of a neutral state and changes color reversibly by reducing, will be referred to as a reduced electrochromic material (a reduced electrochromic compound or reduced electrochromic composition).

In the electrochromic element 1 that is an electrochemical device, when an oxidation reaction (reaction for giving an electric charge) occurs on one of the first electrode for display 12 and the second electrode for display 13, a reduction reaction (reaction for receiving an electric charge) occurs on the other electrode. Therefore, a layer (first electrochromic layer 16) including one or both of the oxidized electrochromic compound and the oxidized electrochromic composition is formed on one electrode (first electrode for display 12). Furthermore, a layer (second electrochromic layer 17) including one or both of the reduced electrochromic compound and the reduced electrochromic composition is formed on the other electrode (second electrode for display 13). Accordingly, compared with the case where one of the electrodes is unreactive, the following advantages (1) to (5) can be obtained.

Firstly, because the electrochromic compound or the electrochromic composition has a lower oxidation-reduction electric potential than the other materials, an electric voltage for coloring can be made lower. Secondly, because the electrochromic compound or the electrochromic composition is more likely to give/receive an electric charge, a quantity of electric charges necessary for coloring can be made smaller. Thirdly, because an irreversible load reaction hardly occurs on the electrode, degradation of the electrochromic layer 1 can be suppressed. Fourthly, because the chromatic state of the electrochromic compound or the electrochromic composition is more stable than the other material, a memory period can be made longer. Fifthly, because the electrochromic materials on both electrodes generate colors, a color with high density can be generated.

Regarding the "generating color" described in the fifth advantage, it is a mixed color of the color generated by the oxidized electrochromic compound or the oxidized electrochromic composition and the color generated by the reduced electrochromic compound or the reduced electrochromic composition. For example, in order to display black, because there is not an electrochromic material that generates black independently, it is useful to use a mixed color from a plurality of materials. It is preferable if the color generated by the oxidized electrochromic compound or the oxidized electrochromic composition and the color generated by the reduced electrochromic compound or the reduced electrochromic composition have a relation of complementary color and mixed color forming black. In this case, a photochromic device that can switch transparent and dark black with high contrast can be enabled.

The oxidized electrochromic compound may be styryl-based, triphenylamine-based, phenothiazine-based, iridium oxide, Prussian blue or the like. Moreover, the reduced electrochromic compound may be dipyridyl-based, anthraquinone-based, terephthalic acid based, tungsten oxide titanium oxide or the like.

(Conductive or Semi-Conductive Nanostructure)

The conductive or semi-conductive nanostructure according to the embodiment is a structure having concavity and convexity of nanoscales, such as nanoparticles or nano porous structures.

When the electrochromic compound includes phosphonate group, phosphate group or carboxyl group as a bonding or adsorption structure, the electrochromic compound easily combines with the nanostructure, and an electrochromic composition with excellent colored image retention can be obtained.

Moreover, when the electrochromic compound has a silyl group or a silanol group, it is bonded with a nanostructure via a siloxane bond, and the bond becomes strong, and thereby a stable electrochromic composition is obtained. The siloxane bond, mentioned here, is a chemical bond via a silicon atom and an oxygen atom.

Moreover, the electrochromic composition only has to have a structure where the electrochromic compound and the nanostructure are bonded with each other via the siloxane bond, and the method or the form of bonding is not especially limited.

The material of the conductive or semi-conductive nanostructure is preferably a metallic oxide from a viewpoint of the transparency of the material. For the metallic oxide, a metallic oxide including, for example, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, calcium phosphate, or the like, as a main gradient, can be used. Moreover, each metallic oxide may be used independently, or two or more metallic oxides may be mixed and used.

In consideration of the electric characteristic such as electric conductivity or the physical characteristic such as an optical property, when using one metallic oxide selected from titanium oxide, zinc oxide, tin oxide, zirconium oxide, iron oxide, magnesium oxide, indium oxide, tungsten oxide and the like, or a mixture thereof, coloring-decoloring response rate is excellent. Particularly, when titanium oxide is used, the coloring-decoloring response rate is more excellent.

A shape of the metallic oxide is preferably a fine particle of metallic oxide having mean primary particle diameter less than or equal to 30 nm. The smaller the particle diameter is, the greater optical transmissivity for metallic oxide, and a shape with a great surface area per unit volume (in the following, referred to as "specific surface area") is used. By having a great specific surface area, the electrochromic compound is supported more efficiently, and a multicolor display excellent in a display contrast ratio for coloring-decoloring is possible. The specific surface area of the nanostructure is not particularly limited, but may be, for example, 100 $m^2$/g or more.

(Material that can be Oxidized and Reduced Reversibly)

The material that can be oxidized and reduced reversibly and can be used in the electrochemical element is not particularly limited, but a normally known oxidized-reduced material may be used.

Specifically included are a metal such as lithium (Li), sodium (Na), magnesium (Mg), silver (Ag), or copper (Cu) and an alloy including them; a ceramic such as metallic salt, metallic oxide, or metallic sulfide; a carbon material such as graphite, or hard carbon; a low molecular compound that is azobenzene-based, anthraquinone-based, diarylethene-based, dihydroprene-based, styryl-based, stylyl spiropyran based, spirooxazine based, spirothiopyran based, thioindigo based, tetrathiafulvalene based, terephthalic acid based, triphenylmethane based, triphenylamine based, naphthopyran based, viologen based, pyrazoline based, phenazine based, phenylenediamine based, phenoxazine based, phenothiazine based, phthalocyanine based, fluoran based, fulgide based, benzopyran based, or metallocene based; and a high molecular compound such as polyanillene, or polythiophene. The above-described material may be used independently, or two or more materials may be mixed and used.

More preferably, the electrochromic compound or the electrochromic composition may be used. For the electrochromic compound or the electrochromic composition, the above-described compound group that can be used as the electrochromic compound or the electrochromic composition provided on the first electrode for display 12 and the second electrode for display 13 may be used. The above-described material may be used independently, or two or more materials may be mixed and used.

By using the electrochromic compound or the electrochromic composition, three advantages which will be described as follows can be obtained. Firstly, Firstly, because the electrochromic compound or the electrochromic composition has a lower oxidation-reduction electric potential than the other materials, an electric voltage for coloring can be made lower. Secondly, because the electrochromic compound or the electrochromic composition is more likely to give/receive an electric charge, a quantity of electric charges necessary for coloring can be made smaller. Thirdly, because an irreversible load reaction is hard to occur on the electrode, degradation of the electrochromic layer 1 can be suppressed.

More preferably, the same material as the electrochromic compound or the electrochromic composition actually provided on the first electrode for display 12 and the second electrode for display 13 is used. By using the same material, a low-cost and long lifetime device can be obtained according to the effect of simplification of manufacturing processes, reduction of number of materials, suppression of degradation due to impurities derived from other components, suppression of degradation of the electrochromic element 1 due to excessive electric voltage that is greater than or equal to the voltage necessary for coloring-decoloring, or the like. Moreover, the material may be mixed with a conductive auxiliary agent, a binding agent or the like, as necessary.

(First and Second Electrodes for Display)

The first electrode for display 12 and the second electrode for display 13 are electrodes for display, and arranged in the display region.

The material of the first electrode for display 12 and the second electrode for display 13 is not particularly limited and a normally used conductive material can be used. As described above, at least one of the first electrode for display 12 and the second electrode for display 13 is a transparent electrode. The transparent electrode is not particularly limited as long as it is a transparent material having conductivity, and may be appropriately selected depending on the purpose. For example, an inorganic material such as indium oxide doped with tin (will be referred to as "ITO" in the following), tin oxide doped with fluorine (will be referred to as "FTO" in the following), tin oxide doped with antimony (will be referred to as "ATO" in the following), zinc oxide or the like, may be used. Among them, InSnO, GaZnO, SnO, $In_2O_3$, ZnO are preferable.

Furthermore, an electrode, in which a carbon nanotube having transparency or another non-permeable material having high conductivity such as gold (Au), silver (Ag), platinum (Pt), copper (Cu) or the like is formed in a fine shape of a network while maintaining the transparency and improving the conductivity, may be used. Thicknesses of the respective first electrode for display 12 and the second electrode for display 13 can be appropriately adjusted so as to obtain an electric resistance value required for the oxidation and reduction reactions of the first electrochromic layer 16 and the second electrochromic layer 17.

For example, when the ITO is used for the material of the first electrode for display 12 and the second electrode for display 13, mean thicknesses of the respective first electrode for display 12 and the second electrode for display 13 are preferably greater than or equal to 50 nm but less than or equal to 500 nm.

A method for preparing the first electrode for display 12 and the second electrode for display 13 includes, for example, a vacuum evaporation method, a sputtering method, an ion plating method or the like. But, it is not particularly limited, as long as the materials for the first electrode for display 12 and the second electrode for display 13 can be applied and formed by various print methods such as a spin coat method, a casting method, a micro gravure coat method, a gravure coat method, a bar coat method, a roll coat method, a wire bar coat method, a dip coat method, a slit coat method, a capillary coat method, a spray coat method, a nozzle coat method, a gravure print method, a screen print method, a flexographic print method, an offset print method, an inverse print method, or an inkjet print method.

(Third and Fourth Auxiliary Electrodes)

The third auxiliary electrode 14 and the fourth auxiliary electrode 15 are auxiliary electrodes, and are not used for display. A material, a thickness and a preparation method of the third auxiliary electrode 14 and the fourth auxiliary electrode 15 are not particularly limited, and the same material, thickness and method as the first electrode for display 12 and the second electrode for display 13 may be used. The third auxiliary electrode 14 and the fourth auxiliary electrode 15 are not necessarily arranged in the display region, but rather preferably arranged outside the display region when a transparent electrode is used.

(Arrangement of the First and Second Electrodes for Display and the Third and Fourth Auxiliary Electrodes)

In FIG. 1, the first electrode for display 12 and the third auxiliary electrode 14 are arranged on the first support 10 and the second electrode for display 13 and the fourth auxiliary electrode 15 are arranged on the second support 11. However, the third auxiliary electrode 14 and the fourth auxiliary electrode 15 may be arranged at any positions as long as they contact the electrolyte 20.

For example, the third auxiliary electrode 14 and the fourth auxiliary electrode 15 are not necessarily arranged at a predetermined interval and opposed to each other. They may be arranged at positions which are shifted from each other in the planar view. However, by arranging them at a predetermined interval and opposed to each other (i.e. arranging at positions which overlap with each other in the planar view), the effect of enhancing the decoloring response rate becomes prominent.

Moreover, the third auxiliary electrode 14 and the fourth auxiliary electrode 15 are not necessarily arranged in the same plane with the first electrode for display 12 and the second electrode for display 13 (e.g. on the same support). However, by arranging them on the same plane, the manufacturing process can be made simplified.

Particularly, when the material that can be oxidized and reduced reversibly on the third auxiliary electrode 14 and the fourth auxiliary electrode 15 is the same as the electrochromic compound or the electrochromic composition on the first electrode for display 12 and the second electrode for display 13, it is preferable. In this case, the first electrode for display 12 and the third auxiliary electrode 14 and the electrochromic compound or the electrochromic composition can be prepared in the same process as one member. Then, afterwards, the electrode can be cut by laser, for example, to be divided into two electrodes, i.e. the first electrode for display 12 and the third auxiliary electrode 14. The same applies to the second electrode for display 13 and the fourth auxiliary electrode 15.

In addition, the first electrode for display 12 and the fourth auxiliary electrode 15, and the second electrode for display 13 and the third auxiliary electrode 14 may be provided in the same plane. In this case, the electrochromic compound or the electrochromic composition or the material that can be oxidized and reduced reversibly on the first electrode for display 12 and the third auxiliary electrode 14 is an oxidized material. Then, the electrochromic compound or the electrochromic composition or the material that can be oxidized and reduced reversibly on the second electrode for display 13 and the fourth auxiliary electrode 15 is a reduced material.

Therefore, only preparing the first electrode for display 12 and the fourth auxiliary electrode 15, and the second electrode for display 13 and the third auxiliary electrode 14 in the same process as one member is not sufficient. In this case, after preparing them in the same process as one member, it is divided to provide the first electrode for display 12 and the fourth auxiliary electrode 15, and the second electrode for display 13 and the third auxiliary electrode 14. Then, after division, an oxidation and reduction reaction is performed between the third auxiliary electrode 14 and the fourth auxiliary electrode 15, to change the electrochromic compound or the electrochromic composition on the third auxiliary electrode 14 into an oxidized material. Moreover, the electrochromic compound or the electrochromic composition on the fourth auxiliary electrode 15 is changed into a reduced material.

Furthermore, the third auxiliary electrode 14 and the fourth auxiliary electrode 15 are preferably arranged so as to surround an outer periphery of a display region including the first electrode for display 12 and the second electrode for display 13. This is because by arranging the third auxiliary electrode 14 and the fourth auxiliary electrode 15 around the outer periphery of the display, a distance to a site, which is in the first electrode for display 12 and the second electrode for display 13 and is at a position distant from the third auxiliary electrode 14 and the fourth auxiliary electrode 15, becomes smaller, and the decoloring response time becomes shorter.

(Electrolyte)

The electrolyte 20 is filled in between the first electrode for display 12 and the second electrode for display 13, and contacts the third auxiliary electrode 14 and the fourth auxiliary electrode 15. Examples of the electrolyte 20 include an inorganic ion salt, such as alkali metal salt or alkaline earth metal salt; quaternary ammonium salt, and supporting electrolyte of acid or alkali. Specific examples thereof include $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, $Mg(BF_4)_2$, and the like.

As a material of the electrolyte, an ionic liquid can be used. Among them an organic ionic liquid is preferable since it has a molecular structure that exhibits a liquid state in a wide range of temperatures including room temperature. As a cation component, examples of the molecular structure include an imidazole derivative, such as N,N-dimethyl imidazole salt, N,N-methylethyl imidazole salt, or N,N-methylpropyl imidazole salt; a pyridinium derivative such as N,N-dimethyl pyridinium salt, or N,N-methylpropyl pyridinium salt; an aliphatic quaternary ammonium-based compound, such as trimethylpropyl ammonium salt, trimethylhexyl ammonium salt, or triethylhexyl ammonium salt, or the like.

Moreover, as an anion component in the molecular structure, a fluorine-containing compound is preferably used in view of stability in the atmosphere, and examples thereof include $BF_4^-$, $CF_3SO_3^-$, $PF_4^-$, $(CF_3SO_2)_2N-$, or the like.

As the material of the electrolyte 20, an ionic liquid which is optionally formulated with a combination of the cation component and the anion component can be preferably used. The ionic liquid may be directly dissolved in photopolymerizable monomer, oligomer, or a liquid crystal material. Note that, when solubility of the ionic liquid is poor, the ionic liquid may be dissolved in a small amount of a solvent, and then the obtained solution may be mixed with photopolymerizable monomer, oligomer, or a liquid crystal material for use.

Examples of the solvent include propylene carbonate, acetonitrile, γ-butyrolactone, ethylene carbonate, sulfolane, dioxolane, tetrahydrofuran, 2-methyltetrahydrofuran, dimethyl sulfoxide, 1,2-dimethoxyethane, 1,2-ethoxymethoxyethane, polyethylene glycol, alcohols, and a mixed solvent of any combination of the aforementioned solvents.

The electrolyte 20 is not necessarily a low viscous liquid, and can be various embodiments, such as a gel, a cross-linked polymer, or a liquid crystal dispersion. When the electrolyte is formed in a gel state or a solid state, it is advantageous because improvement of strength, improvement of reliability of an element and the like can be obtained. As for a method for solidifying, it is preferred that the electrolyte 20 and the solvent are retained in a polymer resin. As a result, high ion conductivity and solid strength can be attained.

Moreover, as the polymer resin, a photocurable resin is preferable, since usage of the photocurable resin can achieve a production of an element at low temperature and for a short period, compared to a method for forming a thin film through thermal polymerization or evaporation of a solvent. A mean thickness of an electrolyte layer formed of the electrolyte 20 is not particularly limited, and may be appropriately selected depending on the intended purpose, but it is preferably 100 nm or more but 100 μm or less.

(First Support and Second Support)

As the first support 10 and the second support 11, an organic material or an inorganic material known in the art can be used as it is, provided that it is a transparent material and can support the respective layers. As the first support 10 and the second support 11, for example, a glass substrate such as an alkali-free glass, a borosilicate glass, a float glass, a soda-lime glass or the like can be used. Moreover, as the first support 10 and the second support 11, for example, a resin substrate such as a polycarbonate resin, an acrylic resin, polyethylene, polyvinyl chloride, polyester, an epoxy resin, a melamine resin, a phenol resin, a polyurethane resin, or a polyimide resin can be used.

Moreover, the surface of the first support 10 and the second support 11 may be coated with a transparent insulating layer, a UV cutting layer, an anti-reflection layer, or the like, in order to improve water vapor barrier property, gas barrier property, ultraviolet resistance, and visibility. A shape of the first support 10 and the second support 11 may be rectangular or round, and is not particularly limited. The first support 10 and the second support 11 may be a plurality of supports placed on top of one another. For example, water vapor barrier property and gas barrier property can be improved by sandwiching the electrochromic element between two glass substrates. In addition, the electrochromic element 1 may have only any one of the first support 10 and the second support 11.

(Sealant)

The sealant 21 has a function of sealing a side face of the electrochromic element 1 that is bonded and preventing the electrolyte 20 from leaking, and a function of preventing unnecessary matters for a stable operation of the electrochromic element 1, such as water in the air, or oxygen, from entering. As the sealant 21, it is not particularly limited, but for example, an UV-ray curable resin or a thermoset resin can be used. Specific examples thereof include an acryl-based resin, a urethane-based resin, an epoxy-based resin or the like.

(Other Members)

The other members are not particularly limited and may be appropriately selected depending on the intended purpose. Examples of thereof include a porous insulation layer, a protective layer, or the like.

(Porous Insulation Layer)

The porous insulation layer has a function of retaining the electrolyte 20, as well as separating the first electrode for display 12 from the second electrode for display 13 so as to be electrically insulated. A material of the porous insulation layer is porous material without any limitation, and is preferably an organic material or an inorganic material which has high insulation properties and durability, and is excellent in film-forming property, or a composite material thereof.

As a method for producing the porous insulation layer, for example, a sintering method, in which polymer fine particles or inorganic particles are partially fused to each other by adding a binder or the like, to thereby generate pores between the particles may be used. Moreover, an extraction method, in which a constituent layer is formed with a solvent-soluble organic matter or inorganic matter and a solvent-insoluble binder, followed by dissolving the organic matter or inorganic matter using the solvent to thereby form fine pores) may be used. Moreover, a foaming method, in which a material is foamed by heating high molecular polymer or deaerating, may be used. Moreover, a phase inversion method, in which a good solvent and a poor solvent are used to thereby separate a mixture of high polymers into a phase, may be used. Moreover, a radiation irradiation method, in which various radiators radiate to thereby form fine pores, may be used.

A role of the protective layer is to protect the element from external forces, or chemicals used in washing processes, to prevent leakage of the electrolyte 20, and to prevent contamination of unnecessary matter such as moisture or oxygen in the atmosphere in order to stably operate the electrochromic layer 1. A thickness of the protective layer is not particularly limited and may be appropriately selected depending on the intended purpose, but it is preferably 1 µm or more and 200 µm or less. As a material of the protective layer, for example, an UV-ray curable resin or a thermoset resin can be used. Specific examples thereof include an acryl-based resin, a urethane-based resin, and an epoxy-based resin.

<<Display Device>>

Figure 2:
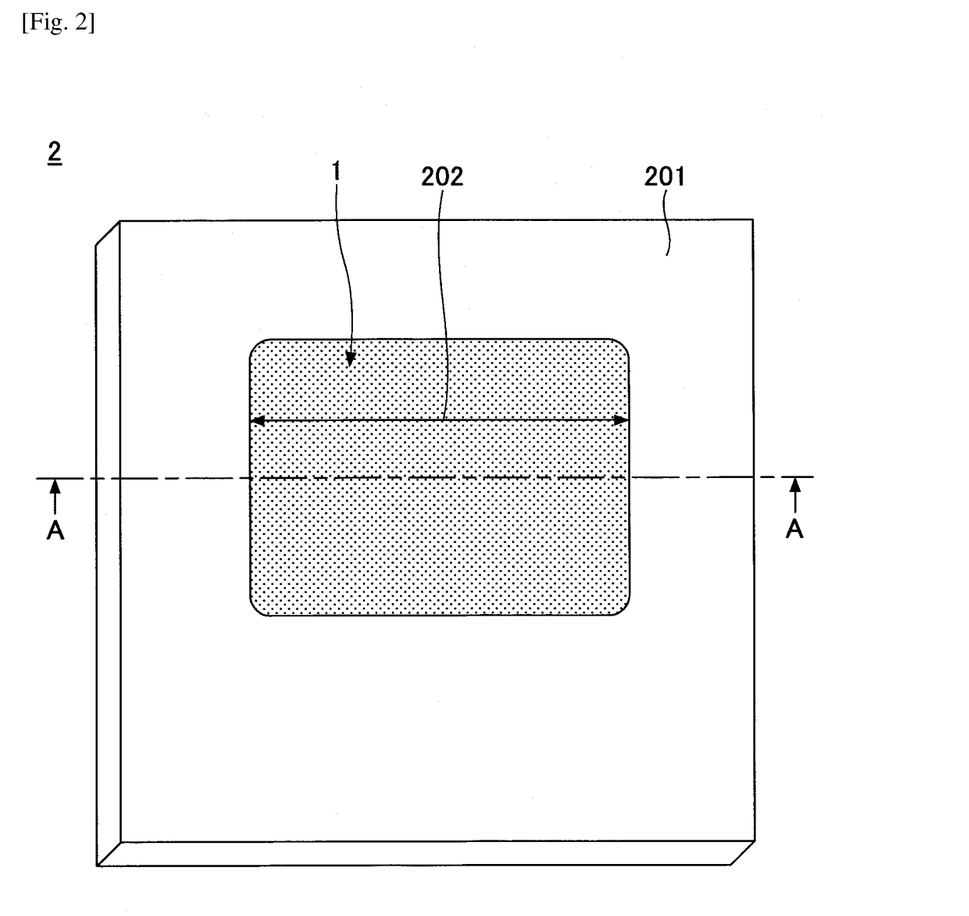
FIG. 2 is a perspective view depicting an example of a display device according to the embodiment.

FIG. 2 is a perspective view depicting an example of a display device according to the embodiment. As shown in FIG. 2, the display device 2 includes the electrochromic element 1, as shown in FIG. 1, and a chassis 201. The chassis 201 retains the electrochromic element 1 and covers the entire electrochromic element 1, and is provided with a display region 202. The display region 202 is, for example, a hole made in the chassis 201. A user can view the electrochromic element 1 through the display region 202. In FIG. 2, for the sake of convenience, the electrochromic element 1 viewed through the display region 202 is shown by a satin pattern.

Moreover, the display device 2 is provided with a driving circuit. The driving circuit is not particularly limited as long as it can apply an electric voltage to the electrochromic element 1, and a publicly known circuit can be used.

Figure 3:
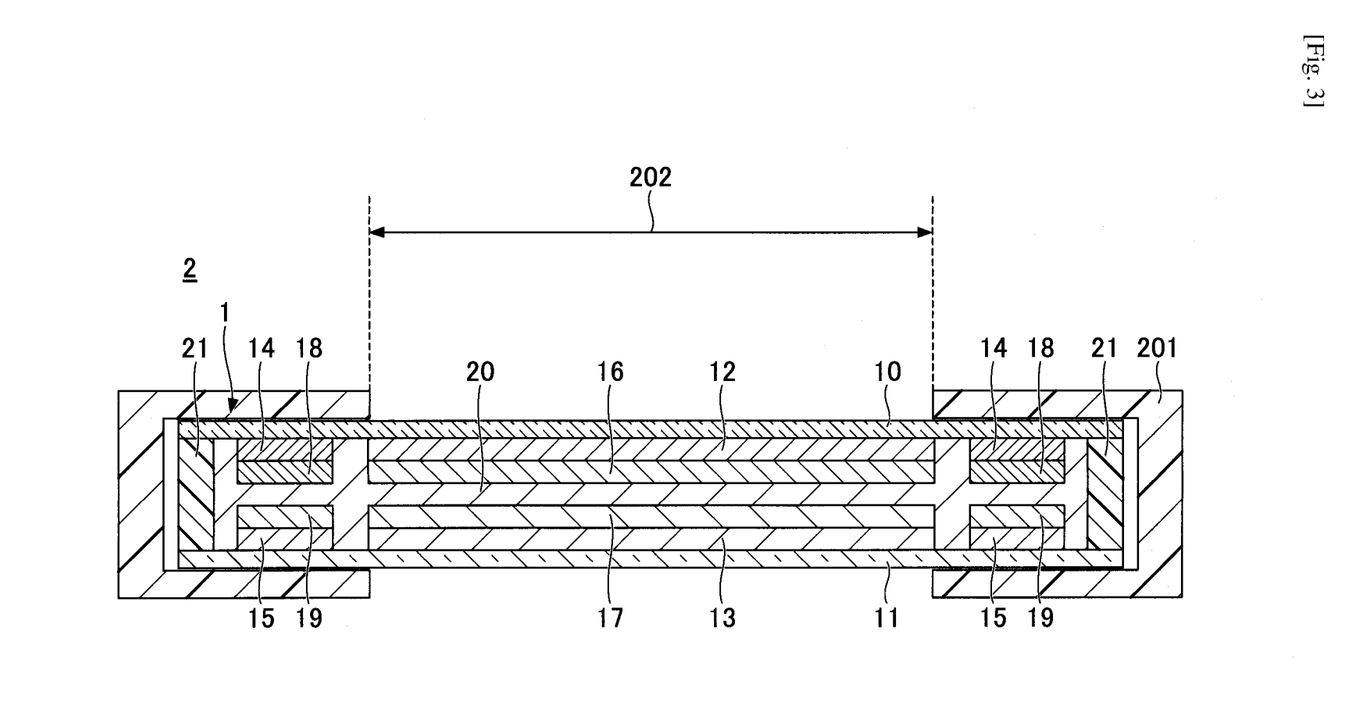
FIG. 3 is a cross-sectional view depicting an example of the display device according to the embodiment.

FIG. 3 is a cross-sectional view depicting an example of the display device according to the embodiment. FIG. 3 shows a cross section cut along the line A-A, shown in FIG. 2. As shown in FIG. 3, the display region 202 exposes only the first electrode for display 12 and the second electrode for display 13. The third auxiliary electrode 14 and the fourth auxiliary electrode 15 are arranged outside the display region. Therefore, the third auxiliary electrode 14 and the fourth auxiliary electrode 15 cannot be seen from outside the display device 2.

<<Driving Method of Electrochromic Element>>

(First Driving Method)

In a first driving method of the electrochromic element 1 according to the embodiment, at first, a step of applying an electric voltage between the third auxiliary electrode 14 and the fourth auxiliary electrode 15 is performed to generate electric charges. Next, a step of applying an electric voltage between the first electrode for display 12 and the fourth auxiliary electrode 15 or between the second electrode for display 13 and the third auxiliary electrode 14 is performed to discharge electric charges, and thereby the electrochromic compound or the electrochromic composition on the first electrode for display 12 or the second electrode for display 13 is returned to the original color.

For decoloring an erasing residue having formed, for example, on the first electrode for display 12 by using the electrochromic element 1, compared with the case of decoloring by applying an electric voltage between the first electrode for display 12 and the third auxiliary electrode 14, the above-described driving method for decoloring reduces the decoloring response time. A principle thereof will be described as follows.

Generally, in oxidizing or reducing an electrochromic compound or an electrochromic composition, by applying a greater electric voltage, an oxidation and reduction reaction progresses sooner. For example, the excess electric voltage is assumed to be distributed equally to an anode and a cathode. In this case, for example, when a decoloring electric voltage of 0 V is applied where an electric potential of the third auxiliary electrode 14 or the fourth auxiliary electrode 15 is −2 V and an electric potential of the first electrode for display 12 is −1 V, a difference in potential between the third auxiliary electrode 14 or the fourth auxiliary electrode 15 and the first electrode for display 12 becomes 0 V. Therefore, the electric potential of each is −1.5 V. Then, a net excess electric voltage applied to the first electrode for display 12 is 0.5 V.

On the other hand, for example, when the decoloring electric voltage of 0 V is applied where the electric potential of the third auxiliary electrode 14 of the fourth auxiliary electrode 15 is −3 V and the electric potential of the first electrode for display 12 is −0 V, a difference in potential between the third auxiliary electrode 14 or the fourth auxiliary electrode 15 and the first electrode for display 12 becomes 0 V. Therefore, the electric potential of each is −1.5 V. Then, a net excess electric voltage applied to the first electrode for display 12 is 1.5 V. The greater the difference in potential between the third auxiliary electrode 14 or the fourth auxiliary electrode 15 and the first electrode for display 12 is, the greater the excess voltage applied to the first electrode for display 12 is, and the decoloring response is improved.

Actually, although the excess electric voltage is not distributed equally to the anode and the cathode, the tendency that the excess electric voltage applied to the first electrode for display 12 increases as the difference in electric potential between the third auxiliary electrode 14 of the fourth auxiliary electrode 15 and the first electrode for display 12 becomes larger is the same.

In this case, the same electrochromic compound or the electrochromic composition is used for the first electrode for display 12 and the third auxiliary electrode 14. Although the electric potential changes somewhat depending on an oxidation or reduction state of the electrochromic compound, a difference thereof is about 0.5 V at most.

On the other hand, because different electrochromic compounds are used for the first electrode for display 12 and the fourth auxiliary electrode 15, the difference in electric potential can be a great electric voltage depending on the selected materials. Therefore, the decoloring response is more excellent when an electric voltage is applied between the first electrode for display 12 and the fourth auxiliary electrode 15 to decolor an erasing residue rather than applying an electric voltage between the first electrode for display 12 and the third auxiliary electrode 14 to decolor the erasing residue. However, because decoloring the erasing residue of the first electrode for display 12 is by a reduction reaction, an oxidation reaction is required to occur on the fourth auxiliary electrode 15.

However, because the electrochromic compound on the fourth auxiliary electrode 15 is a reduced electrochromic compound, an irreversible oxidation reaction occurs in the electrochromic compound or the electrolyte 20 as it is, and the electrochromic element 1 degrades. Then, before the step of decoloring the erasing residue, the following step is performed. That is, a step of charging between the third auxiliary electrode 14 and the fourth auxiliary electrode 15 is performed to oxidize the electrochromic compound included in the reduction layer 18 on the third auxiliary electrode 14, and reducing the electrochromic compound included in the oxidized layer 19 on the fourth auxiliary electrode 15.

According to the above-described processes, it becomes possible to cause an oxidation reaction to occur in the fourth auxiliary electrode 15, and it becomes possible to decolor an erasing residue between the first electrode for display 12 and the fourth auxiliary electrode 15, and thereby the erasing residue can be decolored promptly without causing the electrochromic element 1 to degrade.

Furthermore, because the difference in electric potential between the first electrode for display 12 and the fourth auxiliary electrode 15 becomes further greater by performing charging between the third auxiliary electrode 14 and the fourth auxiliary electrode 15, the decoloring response is further improved. On the other hand, by not always causing the oxidation and reduction state between the third auxiliary electrode 14 and the fourth auxiliary electrode 15 to be a charged state, but by charging only when decoloring an erasing residue, the electric voltage between the third auxiliary electrode 14 and the fourth auxiliary electrode 15 can be maintained small in a normal state. Accordingly, it becomes possible to prevent the electrochromic compound and the electrolyte 20 from degrading.

In decoloring by using auxiliary electrodes in the electrochromic element in the related art, only an electrode or a kind of electrode is used for the auxiliary electrode, and there is a problem that a decoloring response time becomes quite long. In order to shorten the decoloring response time, it is effective to increase a difference in electric potential between an oxidation and reduction electric potential of the auxiliary electrode and an oxidation and reduction electric potential of the electrochromic material. On the other hand, a great difference in electric potential places a great burden on an electrolyte between electrodes. Therefore, the electrolyte degrades, and there is a problem in durability.

On the other hand, the electrochromic element 1 according to the embodiment is provided with two electrodes, i.e. the third auxiliary electrode 14 and the fourth auxiliary electrode 15, as described above, and each electrode is provided with a layer including an oxidized electrochromic compound and a layer including a reduced electrochromic compound. Accordingly, because a high electric voltage advantageous for decoloring response can be generated only at the time of need, it becomes possible to promptly decolor an erasing residue while preventing the electrochromic compound or the electrolyte 20 from degrading. That is, it is possible to enable enhancement of a decoloring response rate and a high durability simultaneously. This is a principle that cannot be enabled in the configuration of the electrochromic element in the related art in which only one electrode or one kind of electrode is used for the auxiliary electrode.

(Second Driving Method)

In a second driving method of the electrochromic element 1 according to the embodiment, at first, a step of applying an electric voltage between the first electrode for display 12 and the fourth auxiliary electrode 15 or between the second electrode for display 13 and the third auxiliary electrode 14 is performed to discharge electric charges. Then, next, a step of further applying an electric voltage between the third auxiliary electrode 14 and the fourth auxiliary electrode 15 is performed to discharge electric charges, and thereby the electrochromic compound or the electrochromic composition on the first electrode for display 12 or the second electrode for display 13 is returned to the original color.

When the electric voltage is applied between the first electrode for display 12 and the fourth auxiliary electrode 15 or between the second electrode for display 13 and the third auxiliary electrode 14 to decolor an erasing residue on the first electrode for display 12 or the second electrode for display 13, care should be taken regarding the following points. That is, it is necessary not to cause an irreversible reaction to occur in the electrochromic compound or the electrolyte 20 on the third auxiliary electrode 14 of the fourth auxiliary electrode 15. For such occasions, it is necessary to generate in advance between the third auxiliary electrode 14 and the fourth auxiliary electrode 15 an amount of electric charges greater than an amount of electric charges retained as an erasing residue on the first electrode for display 12 or the second electrode for display 13.

Particularly, because as the amount of electric charges to be generated in advance increases, a difference in electric voltage between the first electrode for display 12 and the fourth auxiliary electrode 15 or the second electrode for display 13 and the third auxiliary electrode 14 becomes greater, and the decoloring response is improved. However, on the other hand, the amount of electric charges to be generated in advance is greater than the amount of electric charges of the erasing residue. Therefore, when an electric voltage is applied between the first electrode for display 12 and the fourth auxiliary electrode 15 or between the second electrode for display 13 and the third auxiliary electrode 14 to decolor the erasing residue on the first electrode for display 12 or the second electrode for display 13, the following problem arises. That is, an amount of electric charges on the third auxiliary electrode 13 or the fourth auxiliary electrode 14 does not become zero, and extra electric charges remain.

Though the electrochromic element 1 has a certain amount of memory property, it is not complete. Therefore, with lapse of time, the electric charges on the third auxiliary electrode 14 of the fourth auxiliary electrode 15 disappear. However, during the period a high electric voltage is applied and the electrochromic compound or the electrolyte 20 degrades.

Then, after applying an electric voltage between the first electrode for display 12 and the fourth auxiliary electrode 15 or between the second electrode for display 13 and the third auxiliary electrode 14 to decolor an erasing residue on the first electrode for display 12 or the second electrode for display 13, an electric voltage is applied between the third auxiliary electrode 14 and the fourth auxiliary electrode 15 to discharge the electric charges. According to the above operation, it is possible to make the amount of electric charges on the third auxiliary electrode 14 or the fourth auxiliary electrode 15 as small as possible. Therefore, it is possible to prevent the electrochromic compound or the electrolyte 20 from degrading.

Moreover, when the third auxiliary electrode 14 and the fourth auxiliary electrode 15 are arranged in the same plane with the first electrode for display 12 and the second electrode for display 13 or on the same support, an interval between the third auxiliary electrode 14 and the fourth auxiliary electrode 15 can be designed in the same way as the interval between the first electrode for display 12 and the second electrode for display 13. The interval between the third auxiliary electrode 14 and the fourth auxiliary electrode 15 can be designed to be 100 μm or less, for example.

Therefore, time for charging or discharging between the third auxiliary electrode 14 and the fourth auxiliary electrode 15 is far shorter than the time for applying electric voltage between the first electrode for display 12 and the fourth auxiliary electrode 15 or between the second electrode for display 13 and the third auxiliary electrode 14 to decolor an erasing residue on the first electrode for display 12 or the second electrode for display 13. Therefore, an influence from time of charging between the third auxiliary electrode 14 and the fourth auxiliary electrode 15 on the decoloring response time to make it longer is quite small. Instead, the influence by the above-described principle to make the decoloring response time shorter is far greater. As a result, by the driving method according to the embodiment, the decoloring response rate increases.

As described above, the electrochromic element 1 includes less erasing residue and is excellent in durability. Therefore, as a usage of the display device 2, it can be preferably used, for example, for an electrochromic display, a large sized display board such as a display board for stock prices, an antidazzle mirror, a dimming element such as a dimming glass, a low-electric voltage driving element such as a touch panel key switch, an optical switch, an optical memory, electronic paper, an electronic album or the like.

In the following, though examples of the present invention will be described, the present invention is not limited to the following examples.

First Example

(Formation of First Electrochromic Layer 16 and Reduction Layer 18)

First, on a glass substrate serving as a first support 10, an ITO glass substrate, in which an ITO serving as a first electrode for display 12 and a third auxiliary electrode 14 is formed (40 mm×40 mm, thickness 0.7 mm, ITO film thickness: about 100 nm), is prepared. Then, the ITO of the ITO glass substrate is divided into three by using a laser machining device, as shown in FIG. 1, so as to be 40 mm×10 mm, 40 mm×20 mm, and 40 mm×10 mm, respectively. The three pieces are the third auxiliary electrode 14, the first electrode for display 12 and the third auxiliary electrode 14, respectively.

Next, a masking tape adheres on the third auxiliary electrode 14. Then, a solution in which polyethylene glycol diacrylate (Nippon Kayaku Co., Ltd., PEG400DA), photo initiator (BASF SE, IRGACURE 184), a compound expressed by a structural formula A and 2-butanone are mixed with a mass ratio of (57:3:140:800) is generated. Afterwards, the generated solution is applied on the ITO glass substrate by a spin coat method. The applied solution is UV-cured in a nitrogen atmosphere, and thereby the first electrochromic layer 16 having a thickness of 1.1 μm including the compound expressed by the structural formula A is formed on the first electrode for display 12.

Next, the masking tape on the third auxiliary electrode 14 is removed. Then, Ag paste (Fujikura Kasei Co., Ltd., DOTITE D-550) is applied and heat-treated at 120° C. for 10 minutes, and thereby the reduction layer 18 with a thickness of 10.0 μm including reductant of a material which can be oxidized and reduced reversibly is formed on the third auxiliary electrode 14.

[Chem.2]

(Formation of Second Electrochromic Layer 17 and Oxidation Layer 19)

At first, on a glass substrate, serving as a second support 11, an ITO glass substrate, in which an ITO serving as a second electrode for display 13 and a fourth auxiliary electrode 15 is formed (40 mm×40 mm, thickness 0.7 mm, ITO film thickness: about 100 nm), is prepared. Then, the ITO of the ITO glass substrate is divided into three by using the laser machining device, as shown in FIG. 1, so as to be 40 mm×10 mm, 40 mm×20 mm, and 40 mm×10 mm, respectively. The three pieces are the fourth auxiliary electrode 15, the second electrode for display 13 and the fourth auxiliary electrode 15, respectively.

Next, a masking tape adheres on the fourth auxiliary electrode 15. Then, a titanium oxide nanoparticle dispersion liquid (product name: SP210, Showa Titanium Co., Ltd., average particle diameter: about 20 nm) is applied by the spin coat method, followed by annealing at 120° C. for 15 minutes, to thereby form a titanium oxide particle film. On this titanium oxide particle film, a 2,2,3,3-Tetrafluoro propanol solution of 2 wt % of a compound expressed by the structural formula B is applied by the spin coat method as an application liquid. Afterwards, the application liquid is annealed at 120° C. for 10 minutes, and thereby the second electrochromic layer 17 with a thickness of 1.0 μm, in which the compound expressed by the structural formula B is absorbed on the surface of titanium oxide particles on the second electrode for display 13, is formed.

Next, the masking tape on the fourth auxiliary electrode 15 is removed. Then, a silver chloride ink (BAS Inc.) is applied and heat-treated at 60° C. for 15 minutes, and thereby the oxidation layer 19 with a thickness of 10.0 μm including oxidant of a material which can be oxidized and reduced reversibly is formed on the fourth auxiliary electrode 15.

seen from the display region, but the third auxiliary electrode 14 and the fourth auxiliary electrode 15 are hidden, and thereby the display device 2A is prepared.

(Repeat Test)

Coloring and decoloring of the prepared display device 2A at −2 V for 5 seconds for coloring, and at +0.5 V for 5 seconds for decoloring are repeated 500 times. Afterwards, when an erasing residue appears, an electric voltage of +1.0 V is applied between the first electrode for display 12 and the third auxiliary electrode 14 and between the fourth auxiliary electrode 15 and the second electrode for display 13, to decolor the erasing residue.

Then, for the maximum absorption wavelength λmax in the visible range (400 nm to 800 nm) during the test, a transmission factor at the center of the display region is measured by USB4000 manufactured by Ocean Optics, Inc., which measures a time until the transmission factor returns to 95% of the initial state or more. Furthermore, this test is repeated successively 10 times, i.e. repeated 5000 times in total. Then, a repetition number, at which even if the decoloring of erasing residue is performed for 60 seconds, the transmission factor does not return to 95% of the initial

[Chem.3]

B (Filling with Electrolyte)

An electrolyte solution having the following formulation is prepared.

IRGACURE184 (product of BASF Japan Ltd.): 5 parts by mass,

PEG400DA (product of Nippon Kayaku Co., Ltd.): 100 parts by mass,

Potassium chloride (Kanto Chemical Co., Inc.): 10 parts by mass, and 1-ethyl-3-methylimidazolium tetracyanoborate (product of Merck KGaA): 50 parts by mass.

The obtained electrolytic solution is weighed and collected by 30 mg using a micropipette, and dropped on the first support 10 (glass substrate) on which the first electrode for display 12 and the third auxiliary electrode 14 are formed. The second support 11 (glass substrate), on which the second electrode for display 13 and the fourth auxiliary electrode 15 are formed, is laminated thereon in a manner that electrode extraction parts are formed, and thereby a bonded element is prepared.

The obtained bonded element is irradiated with UV rays at 10 mW for 60 seconds by means of an UV (wavelength 250 nm) radiation device (SPOT CURE, product of USHIO INC.). In the manner as described above, an electrochromic element 1A is prepared.

(Preparing Display Device)

A hole of the same size as that of the first electrode for display 12 and the second electrode for display 13 is made in each of two white acrylic plates with thicknesses of 5 mm and serves as a display region. The electrochromic element 1A is sandwiched by the plates so that the first electrode for display 12 and the second electrode for display 13 can be state or more, is measured. In the repeat test, applying an electric voltage of XX Volts between an electrode A and an electrode B means that an electric voltage is applied to the electrode B so that an electric potential is XX Volts with respect to an electric potential of the electrode A.

Second Example (Formation of First Electrochromic Layer 16 and Reduction Layer 18)

At first, on a glass substrate, serving as a first support 10, an ITO glass substrate, in which an ITO serving as a first electrode for display 12 and a third auxiliary electrode 14 is formed (40 mm×40 mm, thickness 0.7 mm, ITO film thickness: about 100 nm), is prepared. Then, a titanium oxide nanoparticle dispersion liquid (product name: SP210, Showa Titanium Co., Ltd., average particle diameter: about 20 nm) is applied on the ITO glass substrate by the spin coat method, followed by annealing at 120° C. for 15 minutes, to thereby form a titanium oxide particle film.

On this titanium oxide particle film, a 2,2,3,3-Tetrafluoro propanol solution of 2 wt % of a compound expressed by the structural formula C is applied by the spin coat method as an application liquid. Then, the application liquid is annealed at 120° C. for 10 minutes, and thereby a first layer (serving as the first electrochromic layer 16 and the reduction layer 18) with a thickness of 1.0 μm, in which the compound expressed by the structural formula C is absorbed on surface of titanium oxide particles, is formed.

[Chem.4]

C

Next, the ITO and the first layer are divided into three by using the laser machining device, as shown in FIG. 1, so as to be 40 mm×10 mm, 40 mm×20 mm, and 40 mm×10 mm, respectively. Accordingly, the third auxiliary electrode 14 on which the reduction layer 18 is laminated, the first electrode for display 12 on which the first electrochromic layer 16 is laminated, and the third auxiliary electrode 14 on which the reduction layer 18 is laminated are formed.

(Formation of Second Electrochromic Layer 17 and Oxidation Layer 19)

At first, on a glass substrate, serving as a second support 11, an ITO glass substrate, in which an ITO serving as a second electrode for display 13 and a fourth auxiliary electrode 15 is formed (40 mm×40 mm, thickness 0.7 mm, ITO film thickness: about 100 nm), is prepared. Then, a titanium oxide nanoparticle dispersion liquid (product name: SP210, Showa Titanium Co., Ltd., average particle diameter: about 20 nm) is applied on the ITO glass substrate by the spin coat method, followed by annealing at 120° C. for 15 minutes, to thereby form a titanium oxide particle film.

On this titanium oxide particle film, a 2,2,3,3-Tetrafluoro propanol solution of 2 wt % of a compound expressed by the structural formula D is applied by the spin coat method as an application liquid. Then, the application liquid is annealed at 120° C. for 10 minutes, and thereby a second layer (served as the second electrochromic layer 17 and the oxidation layer 19) with a thickness of 1.0 µm, in which the compound expressed by the structural formula D is absorbed on surface of titanium oxide particles, is formed.

[Chem.5]

D

Next, the ITO and the second layer are divided into three by using the laser machining device, as shown in FIG. 1, so as to be 40 mm×10 mm, 40 mm×20 mm, and 40 mm×10 mm, respectively. Accordingly, the fourth auxiliary electrode 15 on which the oxidation layer 19 is laminated, the second electrode for display 13 on which the second electrochromic layer 17 is laminated, and the fourth auxiliary electrode 15 on which the oxidation layer 19 is laminated are formed.

(Filling in of Electrolyte)

An electrolyte is filled in (supplied) in the same way as in First Example except for changing the formulation of the electrolyte as follows, to prepare an electrochromic element 1B. Then, a display device 2B is prepared in the same way as in First Example. Then, a repeat test is performed in the same way as in First Example.

IRGACURE184 (product of BASF Japan Ltd.): 5 parts by mass,

PEG400DA (product of Nippon Kayaku Co., Ltd.): 100 parts by mass, and 1-ethyl-3-methylimidazolium tetracyanoborate (product of Merck KGaA): 50 parts by mass.

Third Example

A first electrochromic layer 16 and a reduction layer 18 are formed on a first electrode for display 12 and a third auxiliary electrode 14, in the same way as in Second Example. Moreover, a second electrochromic layer 17 and an oxidation layer 19 are formed on a second electrode for display 13 and a fourth auxiliary electrode 15 in the same way as in Second Example except that a compound expressed by a structural formula E is employed instead of the compound expressed by the structural formula D. Then, an electrolyte is supplied in the same way as in Second Example to prepare an electrochromic element 1C. Furthermore, a display device 2C is prepared in the same way as in First Example, and a repeat test is performed in the same way as in First Example.

[Chem.6]

E

Fourth Example

A first electrochromic layer 16 and a reduction layer 18 are formed on a first electrode for display 12 and a third auxiliary electrode 14, in the same way as in Second Example. Moreover, a second electrochromic layer 17 and an oxidation layer 19 are formed on a second electrode for display 13 and a fourth auxiliary electrode 15 in the same way as in Second Example except that a compound expressed by a structural formula B is employed instead of the compound expressed by the structural formula D. Then, an electrolyte is supplied in the same way as in Second Example to prepare an electrochromic element 1D. Furthermore, a display device 2D is prepared in the same way as in First Example, and a repeat test is performed in the same way as in First Example.

Fifth Example

First, on a glass substrate serving as a first support 10, an ITO glass substrate, in which an ITO serving as a first electrode for display 12 and a third auxiliary electrode 14 is formed (40 mm×40 mm, thickness 0.7 mm, ITO film thickness: about 100 nm), is prepared. Then, a solution in which polyethylene glycol diacrylate (Nippon Kayaku Co., Ltd., PEG400DA), photo initiator (BASF SE, IRGACURE 184), a compound expressed by a structural formula A and 2-butanone are mixed with a mass ratio of (57:3:140:800) is generated. Afterwards, the generated solution is applied on the ITO glass substrate by the spin coat method. The applied solution is UV-cured in a nitrogen atmosphere, and thereby a first layer (a layer serving as the first electrochromic layer 16 and the reduction layer 18) having a thickness of 1.1 μm including the compound expressed by the structural formula A is formed.

Next, the ITO and the first layer is divided into three by using the laser machining device, as shown in FIG. 1, so as to be 40 mm×10 mm, 40 mm×20 mm, and 40 mm×10 mm, respectively. Accordingly, the third auxiliary electrode 14 on which the reduction layer 18 is laminated, the first electrode for display 12 on which the first electrochromic layer 16 is laminated, and the third auxiliary electrode 14 on which the reduction layer 18 is laminated are formed.

A second electrochromic layer 17 and an oxidation layer 19 are formed on a second electrode for display 13 and a fourth auxiliary electrode 15 in the same way as in Second Example. Then, an electrolyte is supplied in the same way as in Second Example to prepare an electrochromic element 1E. Furthermore, a display device 2E is prepared in the same way as in First Example, and a repeat test is performed in the same way as in First Example.

Sixth Example

A first electrochromic layer 16 and a reduction layer 18 are formed on a first electrode for display 12 and a third auxiliary electrode 14, in the same way as in Fifth Example. Moreover, a second electrochromic layer 17 and an oxidation layer 19 are formed on a second electrode for display 13 and a fourth auxiliary electrode 15 in the same way as in Third Example. Then, an electrolyte is supplied in the same way as in Second Example to prepare an electrochromic element 1F. Furthermore, a display device 2F is prepared in the same way as in First Example, and a repeat test is performed in the same way as in First Example.

Seventh Example

A first electrochromic layer 16 and a reduction layer 18 are formed on a first electrode for display 12 and a third auxiliary electrode 14, in the same way as in Fifth Example. Moreover, a second electrochromic layer 17 and an oxidation layer 19 are formed on a second electrode for display 13 and a fourth auxiliary electrode 15 in the same way as in Fourth Example. Then, an electrolyte is supplied in the same way as in Second Example to prepare an electrochromic element 1G. Furthermore, a display device 2G is prepared in the same way as in First Example, and a repeat test is performed in the same way as in First Example.

Eighth Example

An electrochromic element 1H is prepared in the same way as in Seventh example, and a display device 2H is prepared in the same way as in First Example.

(Repeat Test)

Coloring and decoloring of the prepared display device 2H applying an electric voltage of −2 V for 5 seconds for coloring between the first electrode for display 12 and the second electrode for display 13 serving as a display unit, and applying an electric voltage of +0.5 V for 5 seconds for decoloring are repeated 500 times. Afterwards, when an erasing residue occurs, at first, an electric voltage of −2 V is applied for a second between the third auxiliary electrode 14 and the fourth auxiliary electrode 15, and then, an electric voltage of +1 V is applied between the first electrode for display 12 and the third auxiliary electrode 14 and between the fourth auxiliary electrode 15 and the second electrode for display 13, to decolor the erasing residue. The repeat test is performed in the same way as in First example, except for the above. Time required for decoloring erasing residue includes a second for applying the electric voltage of −2 V between the third auxiliary electrode 14 and the fourth auxiliary electrode 15.

Ninth Example

A display device 2I is prepared in the same way as in Seventh Example.

(Repeat Test)

Coloring and decoloring of the prepared display device 2I applying an electric voltage of −2 V for 5 seconds for coloring between the first electrode for display 12 and the second electrode for display 13 serving as a display unit, and applying an electric voltage of +0.5 V for 5 seconds for decoloring are repeated 500 times. Afterwards, when an erasing residue occurs, at first, an electric voltage of −2 V is applied for a second between the third auxiliary electrode 14 and the fourth auxiliary electrode 15, and then, an electric voltage of +1 V is applied between the first electrode for display 12 and the third auxiliary electrode 14 and between the fourth auxiliary electrode 15 and the second electrode for display 13, to decolor the erasing residue.

Afterwards, an electric voltage of +0.5 V is applied for a second between the third auxiliary electrode 14 and the fourth auxiliary electrode 15. The repeat test is performed in the same way as in First example, except for the above. The time required for decoloring erasing residue includes a second for applying the electric voltage of −2 V between the third auxiliary electrode 14 and the fourth auxiliary electrode 15 and a second for applying the electric voltage of +0.5 V between the third auxiliary electrode 14 and the fourth auxiliary electrode 15.

Comparative Example

A display device 2J is prepared in the same way as in First Example except that a layer including a material which can be oxidized and reduced is not formed on the fourth auxiliary electrode 15.

(Repeat Test)

Coloring and decoloring of the prepared display device 2J applying an electric voltage of −2 V for 5 seconds for coloring between the first electrode for display 12 and the second electrode for display 13 serving as a display unit, and applying an electric voltage of +0.5 V for 5 seconds for decoloring are repeated 500 times. Afterwards, when an erasing residue occurs, an electric voltage of +1 V is applied serially between the first electrode for display 12 and the third auxiliary electrode 14 and between the fourth auxiliary electrode 15 and the second electrode for display 13, to decolor the erasing residue. The repeat test is performed in the same way as in First example, except for the above.

<Examination of Examples and Comparative Example>

Results of the repeat tests in First to Ninth Examples and Comparative Example are shown in Table 1.

TABLE 1

|  | Time required for decoloring erasing residue (seconds) | Repetition number, at which even if decoloring of erasing residue is performed, transmission factor does not return to 95% of initial state or more |
|---|---|---|
| First example | 25 | 2500 |
| Second example | 19 | 3000 |
| Third example | 19 | 3000 |
| Fourth example | 18 | 3000 |
| Fifth example | 23 | 3000 |
| Sixth example | 24 | 3000 |
| Seventh example | 23 | 3000 |
| Eighth example | 7 | 4500 |
| Ninth example | 8 | 5000 or more |
| Comparative example | 60 or more | 500 |

Table 1 shows that in Comparative example even if an electric voltage of +1 V is applied between the first electrode for display 12 and the third auxiliary electrode 14 and between the third auxiliary electrode 14 and the second electrode for display 13 for 60 seconds for each, the transmission factor does not return to 95% of the initial state or more. On the other hand, in First to Ninth examples, an erasing residue can be decolored by applying an electric voltage for 25 seconds at maximum. Furthermore, the coloring and decoloring can be repeated at least 2500 times.

As described above, it is found that in the display device and the driving method thereof in any one of First to Ninth examples both erasing residues of oxidized electrochromic material and reduced electrochromic material can be decolored sufficiently and promptly.

Although the present invention has been described with reference to embodiments, the present invention is not limited to these embodiments, but various variations and modifications may be made without departing from the scope of the invention as set forth in the accompanying claims.

The present application is based on and claims the benefit of priority of Japanese Priority Applications No. 2015-123459 filed on Jun. 19, 2015 and No. 2016-028259 filed on Feb. 17, 2016, the entire contents of which are hereby incorporated by reference.

INDUSTRIAL APPLICABILITY

The present invention can be applied to an electrochromic element, a display device and a driving method thereof.

REFERENCE SIGNS LIST 1 electrochromic element
2 display device
10 first support
11 second support
12 first electrode for display
13 second electrode for display
14 third auxiliary electrode
15 fourth auxiliary electrode
16 first electrochromic layer
17 second electrochromic layer
18 reduction layer
19 oxidation layer
20 electrolyte
21 sealant
201 chassis
202 display region

The invention claimed is:

1. An electrochromic element comprising:
a first display electrode;
a second display electrode that is arranged at an interval from and opposed to the first display electrode, at least one of the first display electrode and the second display electrode being transparent;
an electrolyte provided between the first display electrode and the second display electrode;
a first electrochromic layer including at least one of an oxidized electrochromic compound and an oxidized electrochromic composition, and contacting the first display electrode and the electrolyte;
a second electrochromic layer including at least one of a reduced electrochromic compound and a reduced electrochromic composition, and contacting the second display electrode and the electrolyte;
a third auxiliary electrode that contacts the electrolyte;
a fourth auxiliary electrode that contacts the electrolyte;
a reduction layer provided on a surface of the third auxiliary electrode, and including a reductant of a first material that can be oxidized and reduced reversibly; and
an oxidation layer provided on a surface of the fourth auxiliary electrode, and including an oxidant of a second material that can be oxidized and reduced reversibly,
wherein the third auxiliary electrode and the fourth auxiliary electrode are configured so that a voltage can be applied between them.

2. The electrochromic element according to claim 1, wherein the reduction layer includes at least one of the oxidized electrochromic compound and the oxidized electrochromic composition, and
wherein the oxidation layer includes at least one of the reduced electrochromic compound and the reduced electrochromic composition.

3. The electrochromic element according to claim 1, wherein the third auxiliary electrode and the fourth auxiliary electrode are arranged at intervals and opposed to each other.

4. The electrochromic element according to claim 1, wherein the first display electrode is in the same plane as one of the third auxiliary electrode and the fourth auxiliary electrode, and
wherein the second display electrode is in the same plane as the other of the third auxiliary electrode and the fourth auxiliary electrode.

5. The electrochromic element according to claim 1, wherein the third auxiliary electrode and the fourth auxiliary electrode are arranged outside the first display electrode and the second display electrode viewed from the first display electrode.

6. The electrochromic element according to claim 5, wherein the third auxiliary electrode and the fourth auxiliary electrode surround an outer periphery of the first display electrode and the second display electrode viewed from the first display electrode.

7. A display device comprising:
the electrochromic element according to claim 1; and
a chassis that covers the electrochromic element so that the first display electrode and the second display electrode are visible from outside and the third auxiliary electrode and the fourth auxiliary electrode are invisible from outside.

8. A driving method for driving the electrochromic element according to claim 1 to control a color of the first electrochromic layer or the second electrochromic layer, the method comprising:
applying an electric voltage between the third auxiliary electrode and the fourth auxiliary electrode to generate electric charges; and
applying an electric voltage between the first display electrode and the fourth auxiliary electrode or between the second display electrode and the third auxiliary electrode to discharge electric charges.

9. A driving method for driving the electrochromic element according to claim 1 to control a color of the first electrochromic layer or the second electrochromic layer, the method comprising:
applying an electric voltage between the first display electrode and the fourth auxiliary electrode or between the second display electrode and the third auxiliary electrode to discharge electric charges; and
applying an electric voltage between the third auxiliary electrode and the fourth auxiliary electrode to discharge electric charges.

10. A driving method for driving the display device according to claim 7 to control a color of the first electrochromic layer or the second electrochromic layer, the method comprising:
applying an electric voltage between the third auxiliary electrode and the fourth auxiliary electrode to generate electric charges; and
applying an electric voltage between the first display electrode and the fourth auxiliary electrode or between the second display electrode and the third auxiliary electrode to discharge electric charges.

11. A driving method for driving the display device according to claim 7 to control a color of the first electrochromic layer or the second electrochromic layer, the method comprising:
applying an electric voltage between the first display electrode and the fourth auxiliary electrode or between the second display electrode and the third auxiliary electrode to discharge electric charges; and
applying an electric voltage between the third auxiliary electrode and the fourth auxiliary electrode to discharge electric charges.

* * * * *